United States Patent [19]

Kishi et al.

[11] Patent Number: 4,617,640
[45] Date of Patent: Oct. 14, 1986

[54] PORTABLE AUTOMATIC NC PROGRAMMING DEVICE

[75] Inventors: Hajimu Kishi, Hino; Tadayoshi Onuki, Sagamihara; Mitsuo Kurakake, Hino, all of Japan

[73] Assignee: Fanuc Ltd., Tokyo, Japan

[21] Appl. No.: 478,225

[22] Filed: Mar. 24, 1983

[30] Foreign Application Priority Data

Mar. 24, 1982 [JP] Japan .................. 57-45530

[51] Int. Cl.⁴ .............................. G06F 9/00
[52] U.S. Cl. ................................. 364/708
[58] Field of Search ........... 364/200 MS File, 708; 312/208

[56] References Cited

U.S. PATENT DOCUMENTS 4,294,496 10/1981 Murez .................. 312/208

OTHER PUBLICATIONS

Byte Magazine, Apr. 1981, p. 8.
Byte Magazine, Jul. 1981, p. 51.

Primary Examiner—Gareth D. Shaw
Assistant Examiner—John G. Mills
Attorney, Agent, or Firm—Armstrong, Nikaido, Marmelstein & Kubovcik

[57] ABSTRACT

An automatic numerical control programming device having a box-like body with a carrying handle and a lid element hinged to the body. The device contains, within the body, a graphic display unit, a floppy deck, an electric processing unit, and controllers. The device also contains, in the inside face of the lid element, a keyboard panel. A carrying handle is attached to either the containing body or the lid element to make the device portable.

1 Claim, 2 Drawing Figures

PORTABLE AUTOMATIC NC PROGRAMMING DEVICE

BACKGROUND OF THE INVENTION

1. Field of the Invention

The present invention relates to an automatic numerical control (NC) programming device used for NC tape preparation systems of NC machine tools. More particularly, the present invention relates to an automatic NC programming device of a type integrated in a single portable unit.

2. Description of Prior Art

In the operation of NC machine tools, previously prepared NC tapes containing the necessary information on the shape, dimensions, and kind of materials of a given workpiece as well as instructions on diverse machining conditions are set in NC control units. The NC control units control the NC machine tools to machine the workpiece into a desired product.

The efficient preparation of NC tapes is essential for effective use of NC machine tools. Novel techniques are therefore being developed to facilitate the preparation of NC tapes. In the conventional NC tape preparation technique, in particular, the NC tape preparation technique using an automatic programming system, it is well known to use the automatic programmed tool (APT) system in which NC tapes are prepared by a computer in accordance with machining plans. APT systems, however, are extremely large.

Recent strides in integrated circuit (IC) techniques, however, have led to a drastic reduction in the size of computers having multiple operating functions. Moreover, software technology is being improved day by day. Consequently, a demand has arisen for facilitation of the preparation of NC tapes by automatic programming devices; preparation of NC tapes by the on-line method using a cathode ray tube (CRT) graphic displayer, and reduction of the installation space required by programming devices in the limited floor space of factories.

SUMMARY OF THE INVENTION

An object of the present invention is therefore to provide an automatic NC programming device for preparing NC tapes, capable of satisfying the above-mentioned demands and capable of being used as an effective NC tape preparation device in NC workshops where many NC machine tools are installed.

Another object of the present invention is to provide an automatic NC programming device assembled into a single portable unit.

In accordance with the present invention, there is provided a portable automatic NC programming device for preparing NC tapes. The device comprises: a box-like casing including a body having an open side thereof, a lid element coupled with the body to cover the open side, and a carrying handle attached to either the body or the lid element; a graphic display unit encased in the body; a floppy deck encased in the body and juxtaposed with the graphic display unit; a keyboard panel arranged inside of the lid element, and a connector for interface, arranged at an outer part of the body. The device is ready for automatic NC programming when the lid element is opened from the body.

BRIEF DESCRIPTION OF THE DRAWINGS

The present invention will be made more apparent from the ensuing description, reference being made to the accompanying drawings, wherein.

DESCRIPTION OF THE PREFERRED EMBODIMENT

Figure 1:
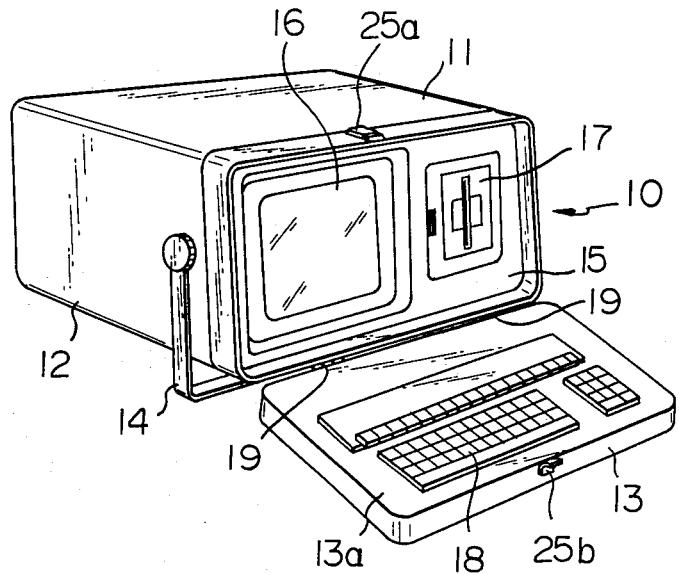
FIG. 1 is a perspective view of a portable automatic NC programming device according to the present invention and an input/output (I/O) unit prepared for use in combination therewith.
Figure 1:
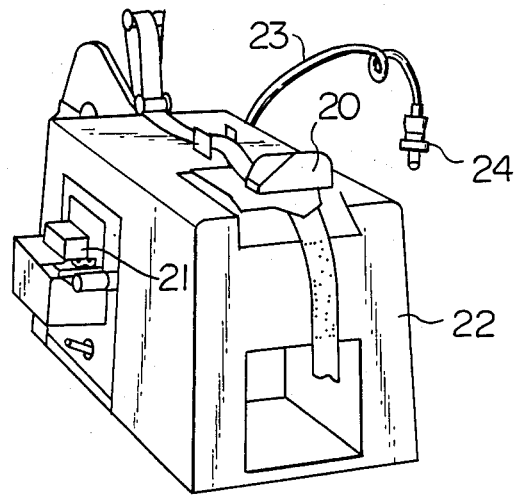
Figure 2:
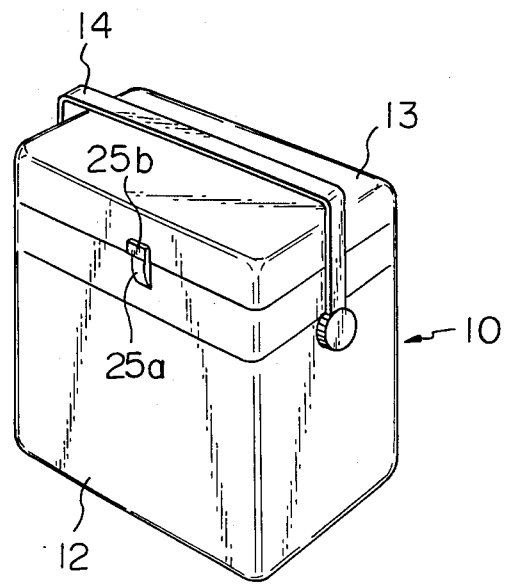
FIG. 2 is a perspective view of the portable automatic NC programming device of FIG. 1 with the lid element closed for carrying purposes.

Referring to FIGS. 1 and 2, a portable automatic NC programming device 10 of the present invention is of the shape of a box in which diverse functional units for NC programming are encased. A box-like casing 11 is provided with a body 12 having a front open side 15, a lid element 13 for covering the front open side 15 of the body 12, and a carrying handle 14 attached to the sides of the body 12 at a position adjacent to the front open side 15. The carrying handle 14 may be attached to the lid element 13, if neces- sary.

In the illustrated embodiment, the body 12 is formed in the shape of a rectangular parallelpiped made of a metal or plastic material. The lid element 13 is formed in the shape of a rectangular plate. The carrying handle 14 is pivoted to the body 12 and is suited for carrying the device as well as lifting the front part of the containing body 12 in use for the purpose of facilitating watching of the front open side 15 from outside.

A CRT display unit 16 and a floppy deck 17 for receiving a floppy disc to store software are mounted in the body 12 in a juxtaposed arrangement through the front open side 15. It should be understood that an electric processing unit and other associated control elements are encased compactly within the body 12 for executing automatic programming.

A keyboard panel 18 including data input keys for programming operations, so-called language keys for the electric processing unit, and tenkey is arranged in the inside face 13a of the lid element 13. The lid element 13 is hinged to the body 12 by means of conventional hinges 19 so as to be free to open and close.

It is to be understood that the keyboard panel 18 and the electric processing unit within the body 12 are electrically connected to one another by means of suitable electric connectors. Thus, an interface connector is provided, for example, on the rear side of the body 12. Electric power is supplied from the outside through the interface connector.

A conventional I/O equipment 22 having a tape puncher 20 and a tape reader 21 can be electrically connected to the automatic NC programming device 10 when an electric cable 23 having a plug 24 is connected to the above-mentioned interface connector. When the I/O equipment is connected to the device 10, it is possible to concurrently execute both automatic NC programming and NC tape punching so that NC tapes are prepared.

A pair of locking members 25a and 25b are cooperably provided for the body 12 and the lid element 13, respectively, so as to enable the lid element 13 to be locked to the body 12 when the lid element 13 is closed. That is, the keyboard panel 18 is integrally held with the body 12.

FIG. 2 illustrates the automatic NC programming device 10 in the state where the body 12 is covered with the lid element 13 and the carrying handle 14 is raised for the purpose of carrying. That is to say, an operator can readily carry the device 10 by hand and store it in a small space within the NC machining workshop. In addition, the operator can readily and freely perform NC programming by the employment of CRT display unit 16, the floppy deck 17, and the keyboard panel 18 when the lid element 13 is opened. At this stage, when the I/O equipment 22 is connected to the device 10, the operator can readily prepare NC tapes.

It should here be understood that the electric processing unit and the controllers contained in the body 12 are sufficiently reduced in size through the application of IC technology. Accordingly, the portable automatic NC programming device of the present invention is not at all functionally inferior to the conventional large APT device. Moreover, the provision of the CRT display unit 16 enables the operator (the programmer) to perform on-line automatic NC programming while visually inspecting the content of the programming.

From the foregoing description of the embodiment, it will readily be understood that according to the present invention, the conventional automatic NC programming device of a rather large system can be replaced with a single portable automatic NC programming device formed as a small industrial product which occupies only a small installation place within an NC machining workshop and which realizes an accessible automatic NC programming device.

We claim:

1. A portable programming device comprising:
   a box like casing including a body having an open side, a lid element hinged along one of its side edges to said body along a side edge of said open side to cover said open side when said lid element is hinged clowed and to expose said open side when said lid element is hinged open, and a carrying handle attached to said body, said body of said box like casing being substantially formed in the shape of a rectangular parallelpiped and said lid element being formed in the shape of a rectangular plate;
   a graphic display unit encased in said body on said open side and exposed for display when said lid element is hinged open;
   a floppy deck encased in said body juxtaposed side by side within said rectangular parallelpiped box with said graphic display unit; and
   a keyboard panel arranged inside of said lid element;
   said device being ready for programming when said lid element is hinged open on said body;
   said carrying handle being pivotally attached at its opposite ends to opposite sides of said body adjacent to said open side and said lid element;
   said handle, when said lid element is hinged open on said body and said device is ready for programming, supporting said open side of said body with said graphic display unit and said floppy deck tipped backward, and said open lid element with said keyboard panel arranged inside thereof tipped forward, from said hinge of said lid element to said rectangular parallelpiped box.

* * * * *